US009111542B1

(12) United States Patent
Hart et al.

(10) Patent No.: US 9,111,542 B1
(45) Date of Patent: Aug. 18, 2015

(54) AUDIO SIGNAL TRANSMISSION TECHNIQUES

(75) Inventors: Gregory M. Hart, Mercer Island, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 376 days.

(21) Appl. No.: 13/430,407

(22) Filed: Mar. 26, 2012

(51) Int. Cl.
*G10L 21/00* (2013.01)
*G10L 19/00* (2013.01)

(52) U.S. Cl.
CPC *G10L 21/00* (2013.01); *G10L 19/00* (2013.01)

(58) Field of Classification Search
CPC .......... G10L 21/00; G10L 15/20; G06G 7/12; H04R 3/00
USPC ......... 704/275, 201, 215, 224, 226, 231, 233, 704/234, 250, 251, 254, 270, 500; 375/285; 381/56, 66, 92, 94.7; 455/570
See application file for complete search history.

(56) References Cited

U.S. PATENT DOCUMENTS

| | | | | |
|---|---|---|---|---|
| 6,002,776 A * | 12/1999 | Bhadkamkar et al. | ........... | 381/66 |
| 6,009,396 A * | 12/1999 | Nagata | ........... | 704/270 |
| 6,157,908 A * | 12/2000 | O'Gwynn | ........... | 704/226 |
| 6,201,499 B1 * | 3/2001 | Hawkes et al. | ........... | 342/387 |
| 6,473,733 B1 * | 10/2002 | McArthur et al. | ........... | 704/224 |
| 6,856,653 B1 * | 2/2005 | Taniguchi et al. | ........... | 375/285 |
| 7,305,095 B2 * | 12/2007 | Rui | ........... | 381/92 |
| 7,418,392 B1 | 8/2008 | Mozer et al. | | |
| 7,443,989 B2 * | 10/2008 | Choi et al. | ........... | 381/92 |
| 7,475,014 B2 * | 1/2009 | Smaragdis et al. | ........... | 704/250 |
| 7,478,041 B2 * | 1/2009 | Ichikawa et al. | ........... | 704/233 |
| 7,561,700 B1 * | 7/2009 | Bernardi et al. | ........... | 381/92 |
| 7,720,683 B1 | 5/2010 | Vermeulen et al. | | |
| 7,774,204 B2 | 8/2010 | Mozer et al. | | |
| 7,813,923 B2 * | 10/2010 | Acero et al. | ........... | 704/233 |
| 7,885,818 B2 * | 2/2011 | Vignoli | ........... | 704/275 |
| 8,363,850 B2 * | 1/2013 | Amada | ........... | 381/94.7 |
| 8,428,661 B2 * | 4/2013 | Chen | ........... | 455/570 |
| 2004/0190730 A1 * | 9/2004 | Rui et al. | ........... | 381/92 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Michael Colucci
(74) *Attorney, Agent, or Firm* — Lee & Hayes, PLLC

(57) ABSTRACT

A voice interaction architecture that compiles multiple audio signals captured at different locations within an environment, determines a time offset between a primary audio signal and other captured audio signals and identifies differences between the primary signal and the other signal(s). Thereafter, the architecture may provide the primary audio signal, an indication of the determined time offset(s) and the identified differences to remote computing resources for further processing. For instance, the architecture may send this information to a network-accessible distributed computing platform that performs beamforming and/or automatic speech recognition (ASR) on the received audio. The distributed computing platform may in turn determine a response to provide based upon the beamforming and/or ASR.

30 Claims, 10 Drawing Sheets

(56) References Cited

U.S. PATENT DOCUMENTS

| | | | |
|---|---|---|---|
| 2005/0080619 A1* | 4/2005 | Choi et al. | 704/215 |
| 2006/0256974 A1* | 11/2006 | Oxford | 381/66 |
| 2007/0150268 A1* | 6/2007 | Acero et al. | 704/226 |
| 2007/0165869 A1* | 7/2007 | Ojanpera | 381/23 |
| 2008/0004875 A1* | 1/2008 | Chengalvarayan et al. | 704/234 |
| 2008/0192955 A1* | 8/2008 | Merks | 381/92 |
| 2008/0249771 A1* | 10/2008 | Wahab | 704/233 |
| 2009/0204410 A1* | 8/2009 | Mozer et al. | 704/275 |
| 2010/0128881 A1* | 5/2010 | Petit et al. | 381/56 |
| 2010/0250243 A1* | 9/2010 | Schalk et al. | 704/201 |
| 2011/0166855 A1* | 7/2011 | Vermeulen et al. | 704/231 |
| 2012/0215539 A1* | 8/2012 | Juneja | 704/254 |
| 2012/0223885 A1 | 9/2012 | Perez | |
| 2013/0054231 A1* | 2/2013 | Jeub et al. | 704/226 |
| 2013/0060571 A1* | 3/2013 | Soemo et al. | 704/251 |
| 2013/0117017 A1* | 5/2013 | Sun et al. | 704/226 |
| 2013/0211846 A1* | 8/2013 | Gibbs et al. | 704/500 |

* cited by examiner

AUDIO SIGNAL TRANSMISSION TECHNIQUES

BACKGROUND

Homes are becoming more wired and connected with the proliferation of computing devices such as desktops, tablets, entertainment systems and portable communication devices. As these computing devices evolve, many different ways have been introduced to allow users to interact with them, such as through mechanical devices (e.g., keyboards, mice, etc.), touch screens, motion detectors and gesture recognition systems. Another way to interact with computing devices is through speech.

One drawback with speech recognition is that vocal interaction with a computing device can be affected by noises present in the room, the volume of the individual speaking, the location of the individual relative to the device and the orientation of the individual relative to the device. While there are advanced techniques available to extract speech from the audio signal, doing so in near real-time is computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
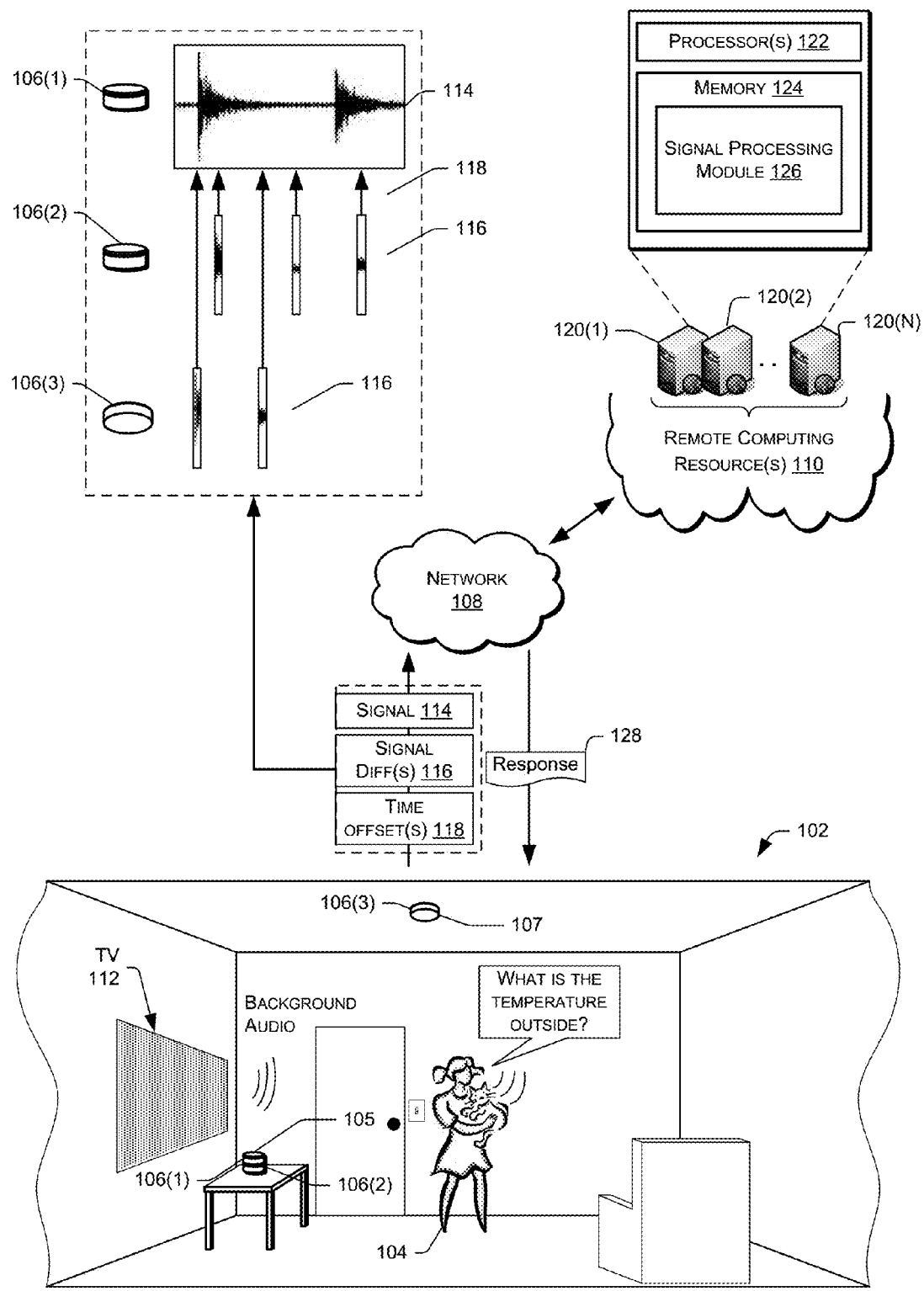
FIG. 1 depicts an example voice interaction computing architecture set in an example home environment.

This disclosure describes, in part, computing devices that collect audio signals within an environment, reduce the amount of data necessary to represent the collected audio signals and provide that reduced data representative of the collected audio signals to a location remote from the environment to allow processing of the collected audio signals at the location remote from the environment. For instance, the computing devices may send the reduced data representative of the collected audio signals to a network-accessible computing platform, such as a distributed computing platform, that performs signal processing, such as beamforming, echo cancellation, noise reduction, dereverberation, blind source separation and the like, on the received audio. The distributed computing platform may, in turn, perform one or more tasks with the processed signals, such as: automatic speech recognition (ASR); determining a response based upon the processed signal; providing an audible response for output in the environment; etc. Reducing the amount of data necessary to represent that collected audio signals may include determining a time shift, also referred to herein as time offset, between a primary audio signal and each other audio signal and identifying differences between the primary audio signal and each other audio signal. Thereafter, the computing devices may provide the primary audio signal, time offset and the signal difference information to remote computing resources for further processing.

By sending a primary audio signal, information indicative of a difference between the sent primary audio signal and audio captured via other audio transducers, the computing devices described below are able to send data sufficient for performing signal processing while reducing the amount of transmitted data. The computing devices are thus able to efficiently utilize the bandwidth available for sending content and the computational resources of the distributed computing platform. The distributed computing platform, in turn, is able to perform signal processing in near real-time utilizing the information and signals provided by the computing devices. In some instances, the distributed computing platform may determine a response to provide back to the environment, potentially for output by the computing devices located in the environment.

In some of the examples described below, an environment includes multiple hands-free, electronic, voice-controlled assistants with which users in the environment may interact. Each of these voice-controlled assistants may include one or more audio transducers, such as a microphone, for receiving user input and, potentially, an output device for providing information to the users (e.g., speakers, a display, etc.). In some examples, the voice-controlled assistants may include a configuration of multiple audio transducers in close proximity to one another, also known as an audio transducer array, or microphone array. While the voice-controlled assistants may be configured to perform relatively basic signal processing on the received user inputs, in some instances these assistants might not be equipped with the computational resources necessary for performing certain operations. For instance, the voice-controlled assistants might not include sufficient computational resources for identifying direction(s) of audio sources and/or for tracking a user or other audio source through the environment.

In one example, a first voice-controlled assistant within the environment may capture multiple audio signals, wherein each audio signal is captured with one of the audio transducers of an audio transducer array. In some examples, the first voice-controlled assistant may also receive one or more audio signals captured by a second voice-controlled assistant, also located within the environment. The first voice-controlled assistant may then determine a time offset between a first audio signal, a second audio signal and any other audio signals captured within the environment. Time offset may be determined using any variety of time-difference-of-arrival ("TDOA") techniques, such as cross-correlation. It will be appreciated that any other technique for determining time offset of the signals may be utilized with the examples described herein.

After identifying a time offset between two audio signals, the first voice-controlled assistant may then identify differences between these signals that are greater than a threshold. After identifying the differences that are greater than the threshold, the first voice-controlled assistant may package the first (or second) audio signal together with segments of the second (or first) audio signal that include information indicative of the difference between the two signals. The first voice-controlled assistant may then send this data over a network to the distributed computing platform. A segment, as used herein, may be any portion, or all of, an audio signal.

Upon receiving the first audio signal and the segments of the second signal, computing resources of the distributed computing platform may construct a representation of the second audio signal and perform signal processing on the first and second audio signals. For instance, these computing resources may utilize various echo cancellation and/or beamforming techniques to isolate a direction of an audio source (e.g., person talking) included in the sent audio signals. The computing resources of the distributed computing platform may thereafter generate instructions for tuning the audio transducers to best capture the identified audio source. In other examples, the distributed computing platform may also perform ASR on a portion of the audio signal and map identified speech to a response, such as a response to provide to the environment or an action to take on behalf of a user. For instance, if the distributed computing platform determines that the audio signal includes a user asking what the current temperature is, the distributed computing platform may determine the location of the user and/or the location of the voice-controlled assistant, determine the current weather at that location and provide the current weather information for output at the environment. Upon receiving data indicative of this response, the first (or another) voice-controlled assistant within the environment may output the response (e.g., "It is currently 72 degrees Fahrenheit outside"). In another example, the distributed computing platform may identify that the user is requesting to obtain an item (e.g., "Order milk from the store") and, in response, the distributed computing platform may trigger fulfillment of this request.

The architecture may be implemented in many ways. One illustrative implementation is described below in which multiple voice-controlled assistants are placed within a room. However, the architecture may be implemented in many other contexts and situations.

FIG. 1 shows an illustrative voice interaction computing architecture set in an example home environment 102 that includes a user 104. The architecture includes electronic, voice-controlled assistants 105, 107 physically situated in a room of the home, but communicatively coupled over a network 108 to remote computing resources 110. In the illustrated implementation, the first voice-controlled assistant 105 is positioned on a table near the user 104, while the second voice-controlled assistant 107 is mounted to the ceiling in the environment. In other implementations, any other number of voice-controlled assistants may be placed in any number of locations (e.g., on walls, in a lamp, beneath a table, under a chair, etc.). As such, implementations described herein may utilize more or fewer voice-controlled assistants than the two described with respect to this FIG. 1. Likewise, voice-controlled assistants may have any number of audio transducers. Some voice-controlled assistants may only include one audio transducer, while others may include multiple audio transducers, which may be configured as part of an audio transducer array.

In some instances, each of the voice-controlled assistants 105, 107 has an audio transducer and speaker to facilitate audio interactions with the user 104. In this example, the first voice-controlled assistant 105 includes two audio transducers 106(1), 106(2) and the second voice-controlled assistant 107 includes a single audio transducer 106(3). The voice-controlled assistants 105, 107 may be implemented with or without a haptic input component (e.g., keyboard, keypad, touch screen, joystick, control buttons, etc.) or a display in some instances. In certain implementations, a limited set of one or more haptic input components may be employed (e.g., a dedicated button to initiate a configuration, power on/off, etc.). Nonetheless, in some instances the primary and potentially only mode of user interaction with the voice-controlled assistants 105, 107 is through voice input and audible output. One example implementation of a voice-controlled assistant 105 is provided below in more detail with reference to FIG. 2.

The voice-controlled assistants 105, 107 detect words and sounds uttered from the user 104, as well as other forms of audio signals within the environment. A user may speak predefined commands (e.g., "Awake," "Sleep"), or use a more casual conversation style when interacting with the voice-controlled assistants 105, 107 (e.g., "What is the temperature outside?"). The vocal input may represent an operational request or command. The requests may be for essentially any type of operation, such as database inquiries, requesting and consuming entertainment (e.g., gaming, finding and playing music, movies or other content, etc.), personal management (e.g., calendaring, note taking, etc.), online shopping, financial transactions and other operations.

In some instances, the voice-controlled assistants 105, 107 include functionality for performing automatic speech recognition (ASR) on the captured audio to identify a command within the audio. After identifying a command from the user 104, a voice-controlled assistant may provide a response. For instance, when the user 104 asks "What is the temperature outside?", one or more of the voice-controlled assistants 105, 107 may identify the query, determine a response to the query and output the response. In the foregoing example, the voice-controlled assistants 105, 107 may perform a search over a network 108 to determine a current temperature at the location of the user 104 and may output this temperature via one or more speakers in the environment 102 (e.g., "It is currently 72 degrees Fahrenheit outside").

In addition to performing ASR, in some instances, the voice-controlled assistants 105, 107 may periodically scan the environment to determine the surrounding acoustical environment. For example, when there is no detected audio, or the audio is below a predetermined threshold, one or more voice-controlled assistants 105, 107 may transmit signals, such as ultrasonic signals, specifically designed to characterize the structures within the environment by modeling their reflection patterns. Based on the reflection patterns, the signals and/or other components of the voice-controlled assistant, such as one or more of the audio transducers, may be adapted to better characterize the environment and collect audio signals from the environment. For example, reflection patterns may be utilized by the voice controlled assistants 105, 107 to perform a scan to determine the dimensions of the environment, the location of objects within the environment and the density of the objects within the environment. In some instances, multiple voice-controlled assistants may coordinate or otherwise share information gained from periodic scans of the environment. Such information may be helpful in performing ASR or other functions as described herein.

In some instances, the ambient conditions of the room may introduce other audio signals that form background noise, which increase the difficulty of performing ASR on the captured audio. In the illustrated example, for instance, the environment 102 includes a television 112 creating background audio. In addition or in the alternative, the user 104 may be located a relatively large distance from the voice-controlled assistants 105, 107 or may be speaking at a relatively low volume.

In these instances, certain signal processing techniques, such as beamforming, may be utilized in order to identify commands and other speech within audio signals captured by the voice-controlled assistants 105, 107. However, in some instances the voice-controlled assistants 105, 107 might not be equipped with the computational resources required to perform the necessary signal processing within an acceptable amount of time after capturing the audio. Therefore, in some instances the voice-controlled assistants 105, 107 may utilize computational capacity of one or more remote computing resources 110 for performing signal processing on audio signals captured within the environment 102. The remote computing resources 110 may form a portion of a network-accessible distributed computing platform implemented as a computing infrastructure of processors, storage, software, data access and other components that is maintained and accessible via a network such as the Internet. Services offered by the resources 110 do not require end user knowledge of the physical location and configuration of the system that delivers the services. Common expressions associated with distributed computing services include "on-demand computing," "software as a service (SaaS)," "platform computing," "network-accessible platform," "cloud-based platform," "cloud computing" and/or other similar terms.

One or more of the voice-controlled assistants 105, 107 may communicatively couple to the remote computing resources 110 via the network 108, which may represent wired technologies (e.g., wires, USB, fiber optic cable, etc.), wireless technologies (e.g., RF, cellular, satellite, Bluetooth, etc.) and/or other connection technologies. The network 108 carries data, such as audio data, between one or more of the voice-controlled assistants 105, 107 and the remote computing resources 110.

Given the relatively large size of audio signals captured by each of the voice-controlled assistants 105, 107, in some instances the assistants may lessen the data provided to the computing resources 110, while still providing data sufficient to allow the resources 110 to perform signal processing and/or other functions on the captured audio. As such, FIG. 1 illustrates that the voice-controlled assistants 105, 107 may provide an audio signal 114, information indicative of differences between audio signals 116 (also referred to herein as "difference information") and a time offset 118 between the audio signals to the remote computing resources 110, to allow the resources 110 to perform signal processing and/or other functions, such as ASR, on the audio captured within the MOM.

As illustrated, in this example the audio signal 114 represents the audio captured by one audio transducer of the voice-controlled assistants 105, 107, namely the audio transducer 106(1) of the voice-controlled assistant 105 in this example. This signal 114 represents the primary audio signal used for calculating the signal difference information 116 as discussed below. The primary audio signal may be selected in any number of ways. For instance, the voice-controlled assistants 105, 107 may determine which of the three audio signals is the strongest signal and may designate that signal as the primary signal. In other instances, the voice-controlled assistants 105, 107 may randomly choose a signal captured by one of the audio transducers for use as the primary signal. A signal may additionally or alternatively be designated as the primary signal in a variety of other ways. In this example, the signal difference information 116 represents differences between the audio signal captured by audio transducer 106(2) and the audio signal captured by audio transducer 106(1), referred to in this example as the primary audio signal. Likewise, the difference information 116 may also include the difference between the audio signal captured by the audio transducer 106(3) and the audio signal captured by the audio transducer 106(1), again the primary audio signal.

In addition, the voice-controlled assistant 105 may determine a time offset between each signal and the primary audio signal 114. For instance, the voice-controlled assistant 105 may determine a time offset between the audio signal captured by the audio transducer 106(2) of the voice-controlled assistant 105 and the audio signal captured by audio transducer 106(1) of voice-controlled assistant 105. In addition, the voice-controlled assistant 105 may determine a time offset between the audio signal captured by the audio transducer 106(3) of voice-controlled assistant 107 and the audio signal captured by the audio transducer 106(1) of voice-controlled assistant 105. These time offsets may be due to the difference in location of each audio transducer with respect to the source of the audio (in this instance, the user 104). In other instances, the voice-controlled assistant may determine a time offset between two non-primary signals.

In order to identify the signal difference information 116 and the time offsets 118, in some instances the voice-controlled assistant 105 compile each audio signal captured by respective audio transducers 106(1)-106(3). For example, the voice-controlled assistant 105 may compile the audio signal captured by audio transducer 106(1), the audio signal captured by audio transducer 106(2) and the audio signal captured by audio transducer 106(3). The voice-controlled assistant 105 may then determine the time offsets between the signals by, for instance, using any TDOA technique, or any other suitable technique. After identifying the respective time offsets, the voice-controlled assistant 105 may then compare the signal selected as the primary signal to each of the other signals to identify differences there between. In other examples, the voice-controlled assistant may compare the signal selected as the primary signal with one or more of the other signals to identify difference information and/or compare non-primary signals with other non-primary signals to identify difference information. For example, if there are three signals, the voice-controlled assistant may select the first signal as the primary signal, compare the second signal with the first signal to identify differences between the first and second signal and compare the third signal with the second signal to identify differences between the third signal and the second signal.

In some instances, the voice-controlled assistant 105 identifies signal differences that are greater than a preset or defined threshold. In some instances, the threshold may be dynamically adjusted based on surrounding noise, the overall difference between the signals, the accuracy of the ASR, the amount of bandwidth available and other parameters. In other examples, the threshold may be zero, in that any difference between audio signals is captured. The threshold may also vary between signals when determining differences. In addition, in some instances, it may be determined that there are no differences between the signals, or no differences between the signals that exceed the threshold.

After identifying the differences, the voice-controlled assistant 105 may prepare the primary audio signal 114, the difference information 116 and time offset data 118 for sending to the remote computing resources 110. The voice-controlled assistant 105 may prepare or package this information in a variety of ways. For instance, the assistant may extract, from the non-primary audio signals, segments that correspond to the signal difference information 116. In other instances, the assistant may extract, from the non-primary audio signals, samples that correspond to the signal difference information 116. For example, if the sample frequency is sixteen kilohertz, the voice-controlled assistant 105 may identify differences between samples and extract differences between those samples. In instances where it is determined that there are no differences between the signals, or no differences between the signals that exceed a threshold, the difference information 116 may identify that there are no differences.

The voice-controlled assistant 105 may also provide time offset data 118 representing where in time the samples correspond to the primary audio signal 114, or other non-primary signals. FIG. 1, for instance, illustrates packaging the primary audio signal 114 with samples corresponding to the signal difference information 116 associated with the two additional audio signals. The arrows between the signal difference information 116 and the primary signal 114 indicate the time offset data 118 by indicating the corresponding location of these samples in the primary signal 114.

In other instances, the voice-controlled assistant 105 might provide the signal difference information 116 in ways other than providing samples of the other signals. For instance, the voice-controlled assistant 105 may determine a difference between the primary audio signal and another audio signal at a particular location and then package an indication of this difference along with time offset information identifying where in the signal the difference occurs. The voice-controlled assistant 105 may additionally or alternatively provide information indicating the signal difference information 116 and the time offset data 118 in a variety of other ways.

After packaging the primary signal 114, the signal difference information 116 and time offset data 118, the voice-controlled assistant 105 may send this information to the remote computing resources 110 over the network 108. As illustrated, the remote computing resources 110 may include one or more servers, such as servers 120(1), 120(2), ..., 120(N). These servers 120(1)-(N) may be arranged in any number of ways, such as server farms, stacks and the like that are commonly used in data centers. Furthermore, the servers 120(1)-(N) may include one or more processors 122 and memory 124, which may store a signal processing module 126.

The signal processing module 126 may be configured, for example, to perform echo cancellation, noise reduction, dereverberation, blind source separation, beamforming and the like. In some instances, the signal processing module 126 may use this information to implement beamforming for the audio transducer array within the voice-controlled assistant 105, to provide a response 128 back to the environment and the like. In other implementations, the module 126 may use information obtained from the voice-controlled assistant 1105 to perform ASR and/or other actions (e.g., initiate a purchase for the user 104, send a message to another user, etc.). As noted above, the signal processing module 126 may utilize beamforming techniques to focus on audio in a particular area within the environment 102, such as a location corresponding to the user 104 to enable or enhance other operations. While computationally expensive, these techniques increase the accuracy of ASR and may allow the resources 110 to effectively track a user through the environment 102, thereby increasing the efficiency of the system.

In some instances, upon receiving the data from the voice-controlled assistant 105 the signal processing module 126 may utilize the primary signal 114, the signal difference information 116 and the time offset 118 to construct representations of the signals captured by the audio transducers. The remote computing resources 110 may then utilize each of the signals to perform the ASR. ASR may be done by combining one or more of the signals and then performing ASR on the combined signal, or by performing ASR on each of the three signals, either sequentially or in parallel. In some instances, if ASR is performed on each of the signals, the results may then be compared and the appropriate speech pattern determined. After doing so, the signal processing module 126 may identify a command and, in some instances, formulate a response 128 comprising audio data that is returned to the voice-controlled assistant 105 over the network 108. When received, the voice-controlled assistant 105 may audibly play the response for the user or the response may be output by another device within the environment 102. Using the illustrated example, the voice-controlled assistant 105 may output a statement informing the user 104 that "It is currently 72 degrees Fahrenheit outside."

Figure 2:
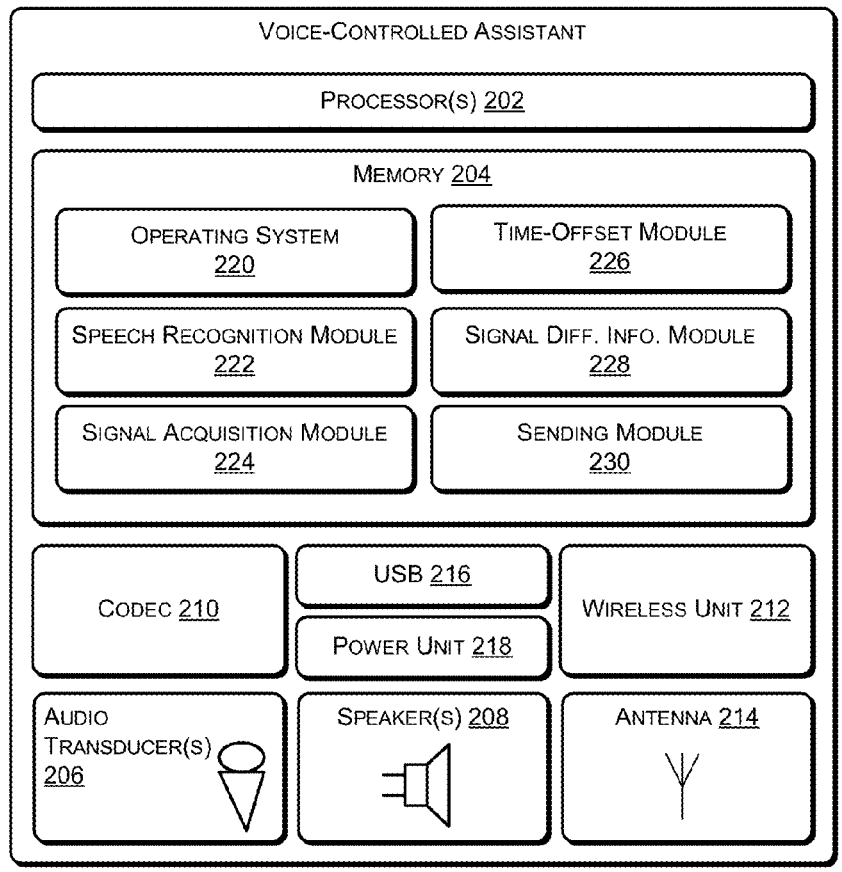
FIG. 2 depicts a block diagram of selected functional components implemented in an example voice-controlled assistant of FIG. 1, including one or more audio transducers for capturing audio within the example environment.

FIG. 2 shows selected functional components of one voice-controlled assistant 105 in more detail. Generally, the voice-controlled assistant 105 may be implemented as a standalone device that includes limited input/output components, memory and processing capabilities. For instance, the voice-controlled assistant 105 might not include a keyboard, keypad or other form of mechanical input. The assistant might also not include a display or touch screen to facilitate visual presentation and user touch input. Instead, the voice-controlled assistant 105 may be implemented with the ability to receive and output audio, a network interface (wireless or wire-based), power and limited processing/memory capabilities.

In the illustrated implementation, the voice-controlled assistant 105 includes one or more processors 202 and memory 204. The memory 204 (and each memory described herein) may include computer-readable storage media ("CRSM"), which may be any available physical media accessible by the processors 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM") or any other medium which can be used to store the desired information and which can be accessed by the processors 202.

The voice-controlled assistant 105 also includes one or more audio transducers 206 for capturing audio within an environment, such as the example environment 102. In some implementations, the audio transducer 206 may take the form of an audio transducer array, such as a microphone array, that includes multiple audio transducers. The voice-controlled assistant 105 may also include one or more speakers 208 to output audio sounds. A codec 210 may couple to the audio transducer(s) 206 and speaker 208 to encode and/or decode the audio signals. The codec may convert audio data between analog and digital formats. A user may interact with the voice-controlled assistant 105 by speaking to it, and the audio transducer(s) 206 captures the user speech. The codec 210 encodes the user speech and transfers that audio data to other components. The voice-controlled assistant 105 can communicate back to the user by emitting audible statements through the speaker 208. In this manner, the user interacts with the voice-controlled assistant 105 simply through speech, without use of a keyboard or display common to other types of devices.

The voice-controlled assistant 105 may also include a wireless unit 212 coupled to an antenna 214 to facilitate a wireless connection to a network. The wireless unit 212 may implement one or more of various wireless technologies, such as Wi-Fi, Bluetooth, RF, Near Field Communication and other wireless technologies.

A USB port 216 may further be provided as part of the voice-controlled assistant 105 to facilitate a wired connection to a network, or a plug-in network device that communicates with other wireless networks. In addition to the USB port 216, or as an alternative thereto, other forms of wired connections may be employed, such as a broadband connection. A power unit 218 is further provided to distribute power to the various components on the voice-controlled assistant 105.

The voice-controlled assistant 105 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens and the like. Further, there is no display for text or graphical output. In one implementation, the voice-controlled assistant 105 may include non-input control mechanisms, such as basic volume control button(s) for increasing/decreasing volume, as well as power and reset buttons. For example, there may also be a simple light element (e.g., LED) to indicate a state such as when power is on and/or when data is being sent or received.

Accordingly, the voice-controlled assistant 105 may be implemented as an aesthetically appealing device with smooth and rounded surfaces, with some apertures for passage of sound waves, a power cord or internal charge (e.g., battery) and communication interface (e.g., broadband, USB, Wi-Fi, etc.). Once plugged in, or otherwise powered, the device may automatically self-configure, or with slight aid of the user, and be ready to use. As a result, the voice-controlled assistant 105 may be generally produced at a relatively low cost. In other implementations, other I/O components may be added to this basic model, such as specialty buttons, a keypad, display and the like.

The memory 204 may store an array of different datastores and/or modules, including an operating system module 220 that is configured to manage hardware and services (e.g., audio transducer, wireless unit, USB, codec) within and coupled to the voice-controlled assistant 105 for the benefit of other modules. A speech recognition module 222 may provide some basic speech recognition functionality. In some implementations, this functionality may be limited to specific commands that perform fundamental tasks like waking up the device, configuring the device, cancelling an input and the like. The amount of speech recognition capabilities implemented on the voice-controlled assistant 105 may vary between implementations, but the architecture described herein supports having some speech recognition local at the voice-controlled assistant 105 together with more expansive speech recognition at the remote computing resources 110.

The memory 204 may further store a signal acquisition module 224, a time offset module 226, a signal difference information module 228, a sending module 230 and a noise canceling module (not shown). The signal acquisition module 224 functions to receive signals representing audio signals captured by audio transducers of other voice-controlled assistant 105 in a common environment. For instance, the signal acquisition module 224 may receive the audio signals captured by the audio transducer(s) 206 of the voice-controlled assistant 105. Likewise, the signal acquisition module 224 may receive audio signals captured by audio transducers of other voice-controlled assistants within the environment. In order to receive signals from other voice-controlled assistants, the voice-controlled assistants may couple wirelessly, via a wired network or the like.

After the voice-controlled assistant 105 receives audio signals, the time offset module 226 may determine a time offset between each signal and a primary signal. As discussed above, the primary signal may comprise the audio signal captured by any audio transducer 106(1)-(3) in the environment 102. After a primary signal is selected, the time offset module 226 may determine the time offsets between the signals using a variety of techniques. For instance, the time offset module 226 may utilize a TDOA technique, such as cross-correlation to determine time offsets between the signals.

After the time offset module 226 identifies the respective time offsets, the signal difference information module 228 may determine differences between the primary signal and each other received audio signal. As discussed above, the difference information module 228 may identify difference between the various signals, or those differences that are greater than a defined threshold. Finally, after the voice-controlled assistant 105 identifies the signal differences, the sending module 230 may send the primary signal, information indicative of signal differences and time offset data to the remote computing resources 110 for further processing. The sending module 230 may package this data together and/or may provide this data over the course of several communications with the remote computing resources 110. In each instance, the sending module 230 refrains from sending an entirety of the non-primary audio signals, but instead sends only the segments of these signals that differ from the primary audio signal and in some instances, only those segments that exceed a threshold value. By limiting the amount of transmitted data, the voice-controlled assistant 105 is able to communicate with the remote computing resources 110 much more efficiently and, therefore, may be able to interact with the user 104 in near real-time.

In addition to determining time offsets and difference information between captured signals, in some instances, the voice-controlled assistant 105 may also identify noise, or audio frequency, that can be removed from the primary signal and any other captured signals before comparison and sending to the remote computing resources 110. For example, if there is a continuous frequency, such as audio generated by a fan located within the environment that can be detected by the voice-controlled assistant 105, the voice-controlled assistant may remove from each of the audio signals the audio frequency(s) generated by the fan before the signals are compared and sent to the remote computing resources 110. Likewise, audio transducers may capture audio frequencies that are outside of the typical human ears' ability to hear. Humans can typically hear frequencies within the range of 20 Hz to 20 kHz. Frequencies outside of this range, such as a dog whistle (which is generally within the range of 23 to 54 kHz) may be captured by the audio transducers but not perceptible to humans. In such instances, the voice-controlled assistant 105 may remove the audio tones/frequencies that are beyond typical human perception.

Figure 3:
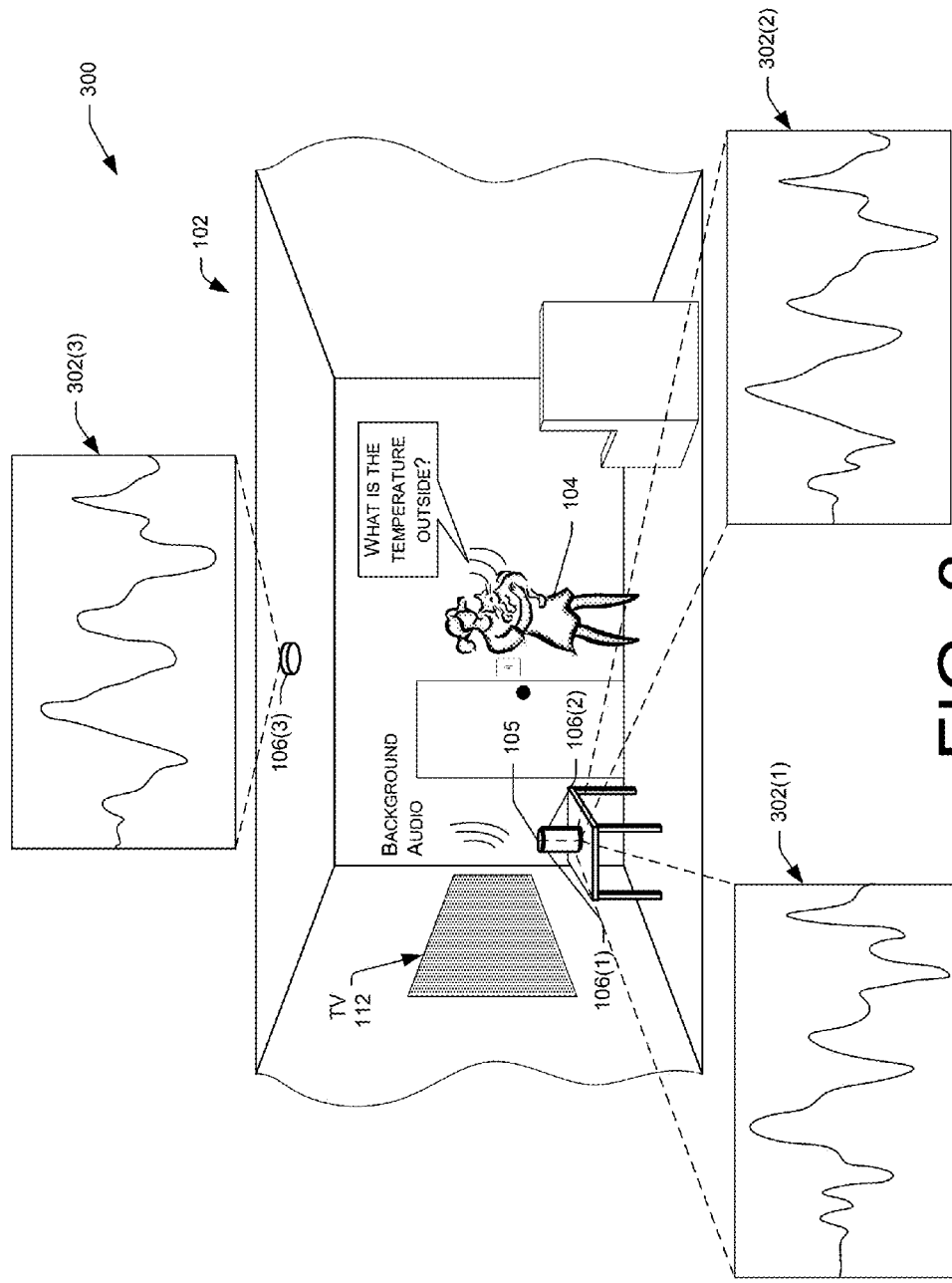
FIG. 3 depicts one possible scenario where the audio transducers of the two different voice-controlled assistants in the example environment of FIG. 1 capture three different audio signals.

FIG. 3 depicts one possible scenario 300 where the three different audio transducers 106(1)-(3) in the example environment 102 capture three different audio signals 302(1), 302(2) and 302(3), respectively. The audio transducers 106 may all be included in the same voice-controlled assistant, for example as part of an audio transducer array, or simply audio transducers in different locations within the environment 102. As illustrated, each audio signal corresponds to audio within the environment 102 when the user 104 is asking a question ("What is the temperature outside?") and while the television 112 emits audio in the background. Also as illustrated, each of the audio signals 302(1)-(3) is different than each other audio signal, partly due to the different locations audio transducers 106(1)-(3) relative to the user 104 and the television 112.

Sometime after each audio transducer 106(1)-(3) captures a respective audio signal 302(1)-(3), each of these audio signals may be compiled by the voice-controlled assistant 105. This compilation may occur periodically, after some trigger (e.g., after the voice-controlled assistant detects a particular keyword spoken by the user 104), randomly or at any other time. Furthermore, while this example describes compiling the audio signals at a voice-controlled assistant, in other implementations a computing device other than a voice-controlled assistant may compile the signals and perform the processing described below. This computing device may reside in the environment 102 or otherwise.

In the instant example, the voice-controlled assistant 105 compiles the three audio signals. That is, in this example, the voice-controlled assistant 105 receives the audio signals 302(1), 302(2) and 302(3) from the respective audio transducers 106(1), 106(2) and 106(3) and compiles them as described below. In this example, the voice-controlled assistant 105 uses the audio signal 302(1) as the primary signal, although another signal may be used as the primary signal in other implementations.

Figure 4A:
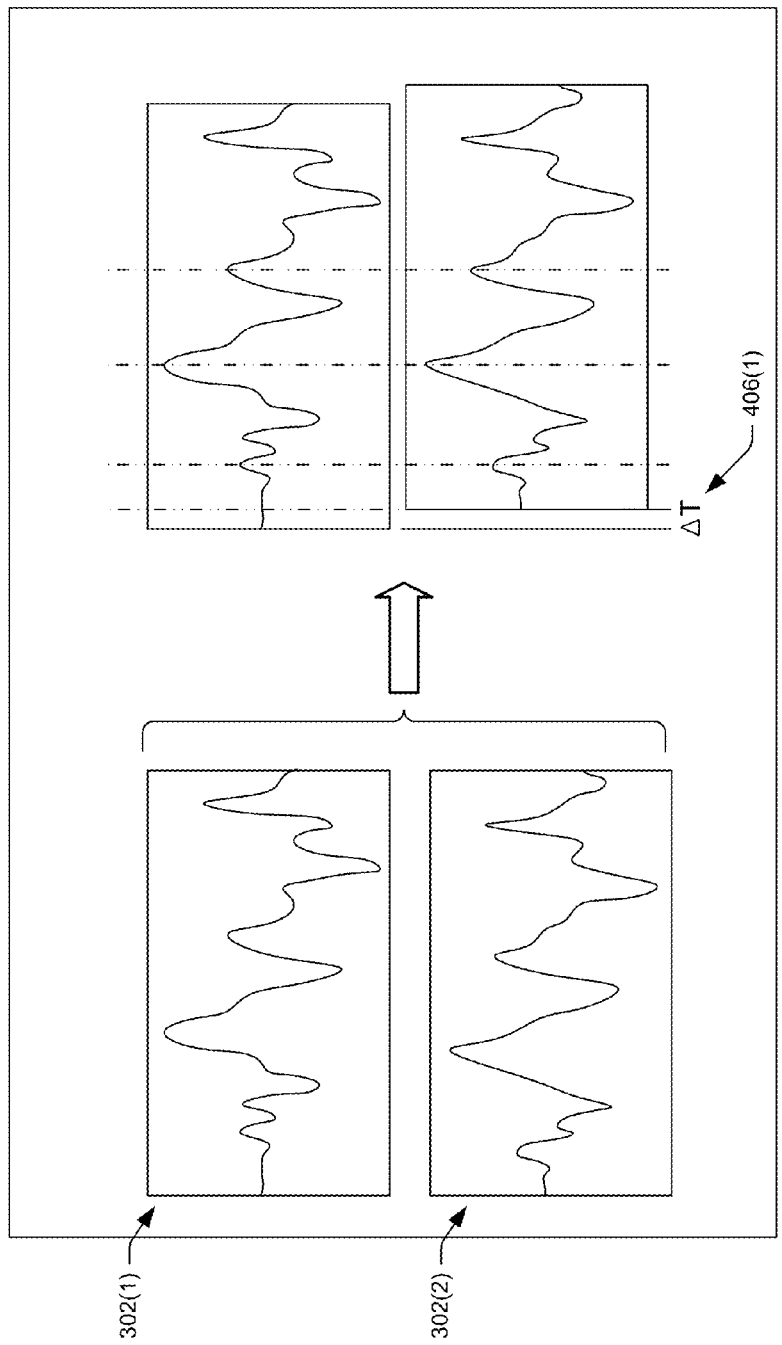
FIGS. 4A and 4B depict possible scenarios of determining a time offset between audio signals of FIG. 3

FIG. 4A depicts a scenario for determining a time offset between the primary audio signal 302(1) and audio signal 302(2). The time offset module 226 may utilize a TDOA technique, such as cross-correlation to identify a time offset 406(1) between the audio signal 302(1) and the audio signal 302(2). As discussed above, the time offset 406(1) may be due to the difference in location of the respective audio transducers with respect to the audio source(s) within the environment 102.

Figure 4B:
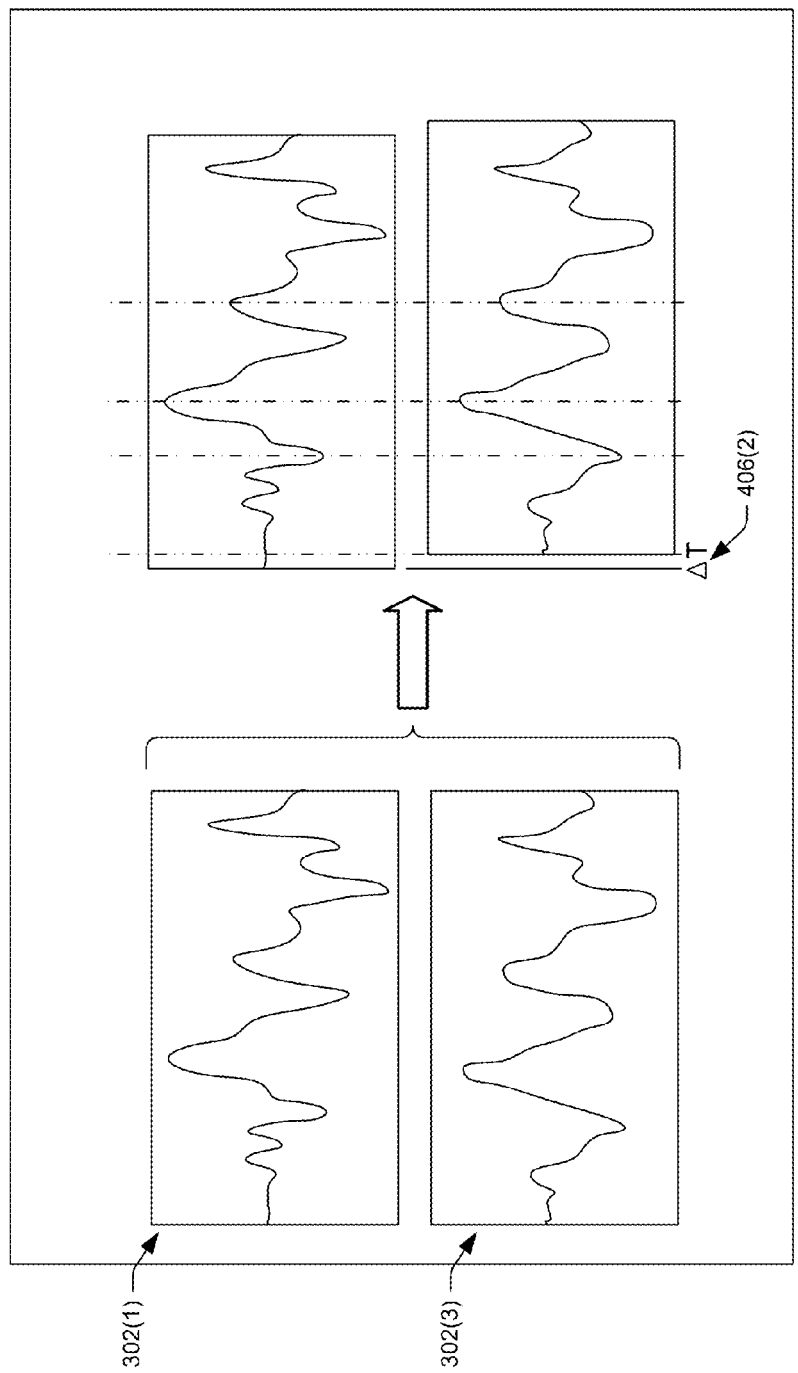

FIG. 4B depicts a scenario for determining a time offset between the primary audio signal 302(1) and audio signal 302(3) captured by the audio transducer 106(3). The time offset module 226 may utilize TDOA, such as cross-correlation to identify a time offset 406(2) between the audio signal 302(1) and the audio signal 302(3). Again, this time offset 406(2) may be due to the difference in location of the respective audio transducers with respect to the audio source(s) within the environment 102.

Figure 5A:
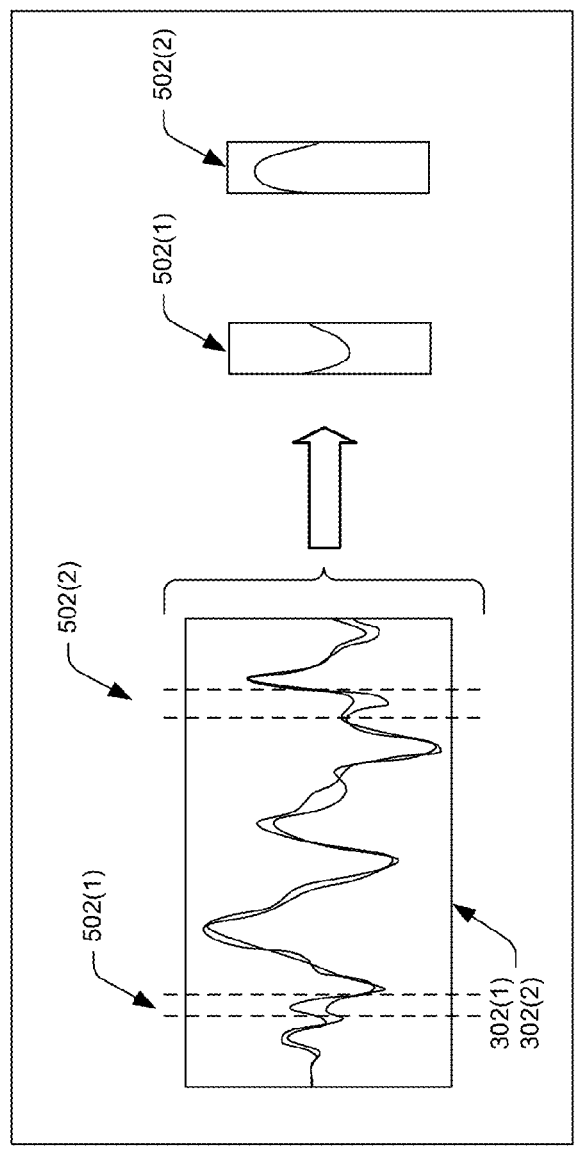
FIG. 5A depicts one possible scenario of determining signal difference information between the first audio signal and the second audio signal using the determined time offset between these signals.

FIG. 5A depicts the signal difference information module 228 determining signal difference information between the audio signal 302(1) and the audio signal 302(2) using the time offset 406(1) determined in the manner shown in FIG. 4A. To identify differences between the signals 302(1) and 302(2) that are greater than the threshold, the signal difference information module 228 may effectively shift one of the signals in an amount equal to the time offset 406(1) and then compare the signals to one another. That is, the module 228 may map segments or samples of the audio signal 302(1) to corresponding segments or samples of the audio signal 302(2) based on the time offset and may then compare these corresponding segments/samples to identify differences between the signals.

In the illustrated example, after comparing segments/samples to identify differences between signals, the signal difference information module 228 identifies two samples of signal difference information (502(1) and 502(2)) that are greater than a threshold. Each of these signals differences 502(1) and 502(2) may comprise one or more segments of the signal 302(2) where the captured signal differs from the primary signal 302(1) by more than the threshold.

Figure 5B:
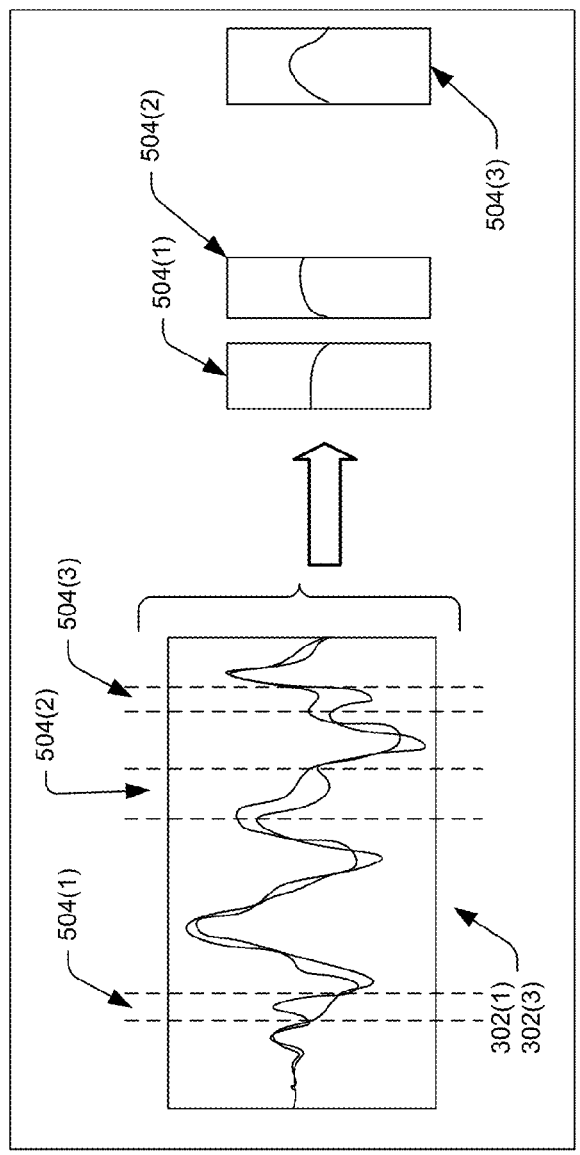
FIG. 5B depicts one possible scenario of determining signal difference information between the first audio signal and the third audio signal using the determined time offset between these signals.

FIG. 5B depicts the signal difference information module 228 determining signal differences between the audio signal 302(1) and the audio signal 302(3) using the time offset 406(2) determined in the manner shown in FIG. 4B. To identify differences between the signals 302(1) and 302(3) that are greater than the threshold, the signal difference information module 228 may again effectively shift one of the signals in an amount equal to the time offset 406(2) and then compare the signals using a TDOA technique, such as cross-correlation, to determine differences. As illustrated, after doing so, the signal difference information module 228 identifies three sets of signal difference information in this example (504(1), 504(2) and 504(3)) that are greater than a threshold. Each of these signals differences may comprise one or more segments or samples of the signal 302(3) where the captured signal differs from the primary signal 302(1).

Figure 6:
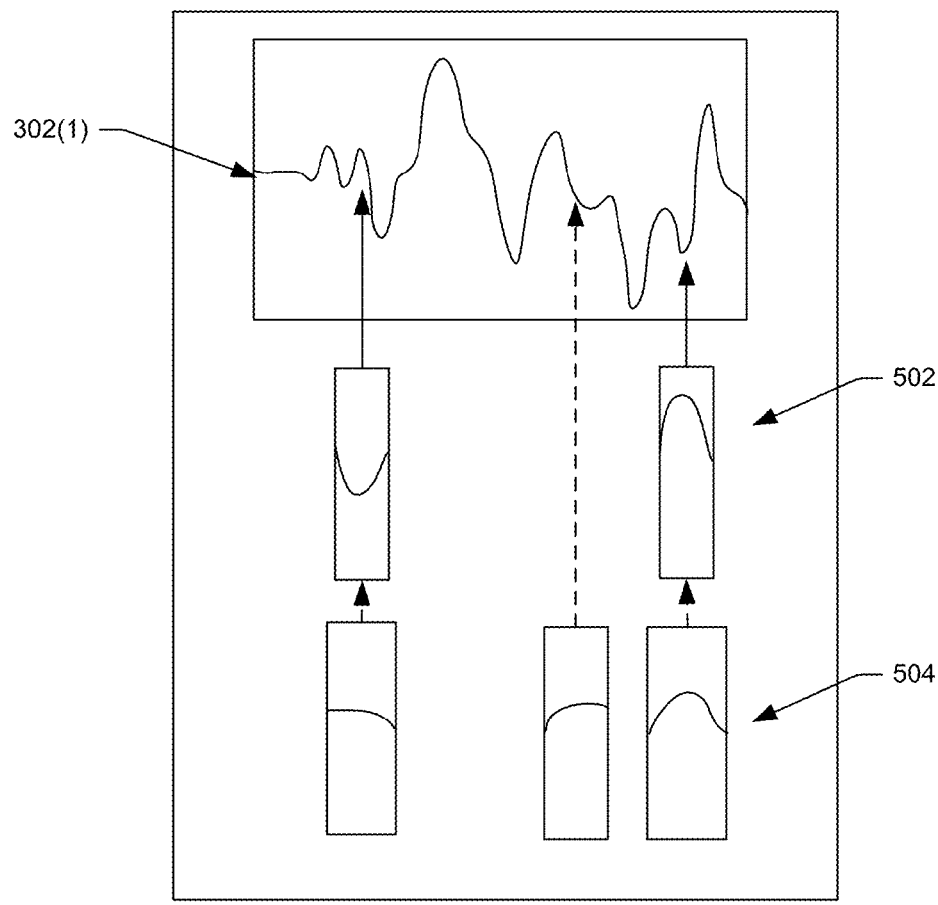
FIG. 6 depicts one possible scenario of packaging the first audio signal, signal difference information between the first and second audio signals, signal difference information between the first and third audio signals, time offset between the first and second audio signals and time offset between the first and third audio signals for sending to the remote computing resources.

FIG. 6 depicts the outputs of the sending module 230, the outputs including the audio signal 302(1) along with information indicative of the signal differences 502 and 504 and correlation of the audio signal 302(1) with each of the signal differences 502 and 504 (represented by the arrows) as determined from the time offset information. As discussed above, in some instances the sending module 230 may send the audio signal 302(1) along with samples of the additional signals 302(2) and 302(3) and corresponding time offset information. In other instances, the sending module may effectively determine the differences at particular locations and send these differences, or difference information, along with corresponding time offset information. Again, other techniques are also possible.

In some instances, the sending module 230 may also compress the audio signal 302(1) and/or the signal differences 502 and 504 prior to sending this data to the remote computing resources 110. For instance, the sending module 230 may utilize any type of lossless or lossy compression to further minimize the amount of data transmitted to the resources 110 over the network 108. In addition, the voice-controlled assistant 105 may also remove frequencies that are common across captured signals and/or remove other frequencies from one or more of the captured signals. For example, if there is a constant audible noise generated by a fan within the environment that is included in each of the captured audio signals, the voice-controlled assistant 105 may remove the frequency or frequencies that cause that noise from the audio signals. Again, reducing the amount of data decreases the communication time between the voice-controlled assistant 105 and the remote computing resources 110, thus increasing the overall responsiveness of the voice interaction architecture.

Figure 7A:
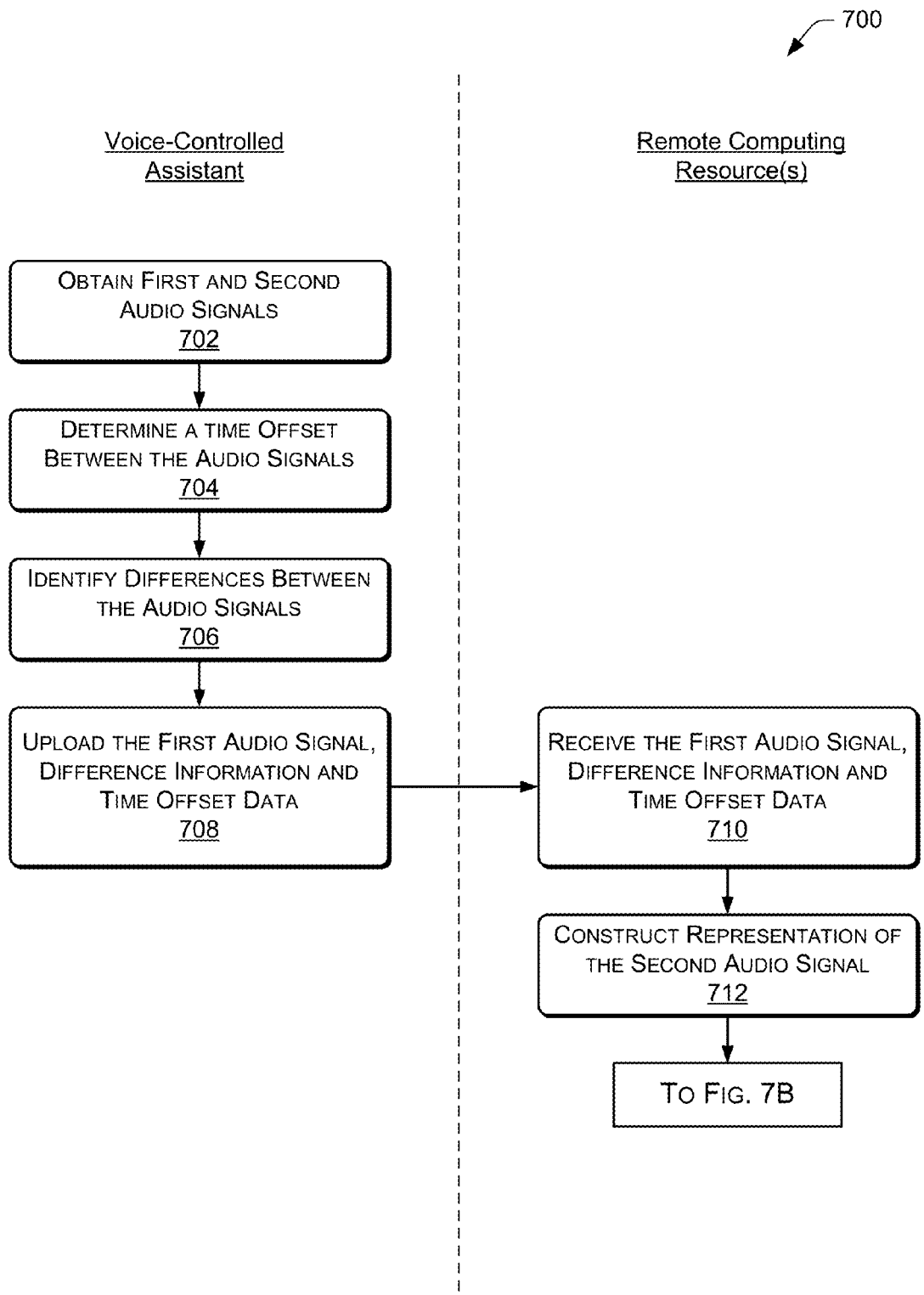
FIGS. 7A and 7B illustrate an example flow diagram of a process for capturing and processing audio signals.
Figure 7B:
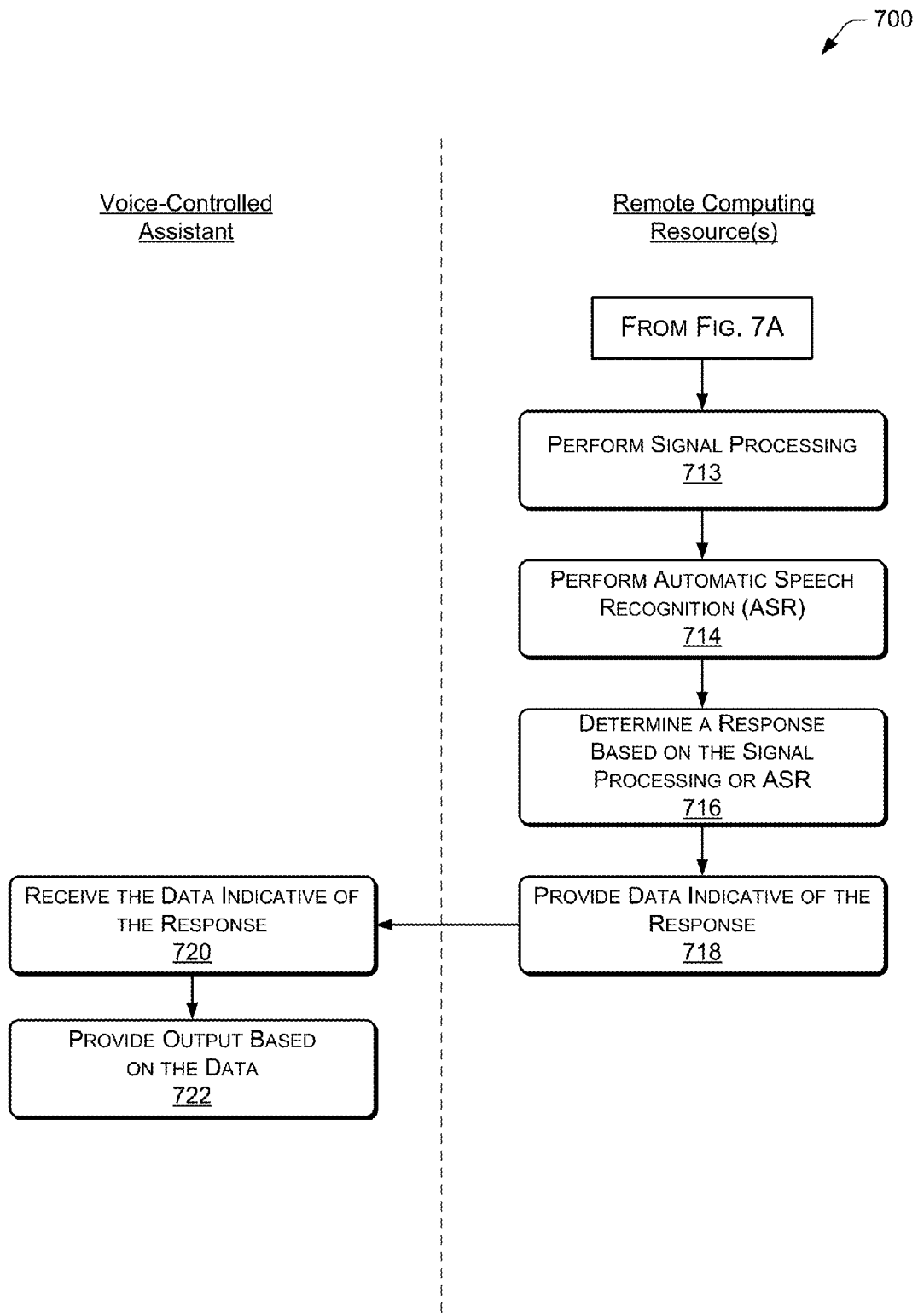

FIGS. 7A and 7B illustrate an example flow diagram of a process 700 for capturing and processing audio signals. This process, and each process described herein, may be implemented by the architectures described above or by other architectures. The process is illustrated as a collection of blocks in a logical flow graph. Some of the blocks represent operations that can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

For purposes of describing one example implementation, the blocks are arranged visually in columns beneath a voice-controlled assistant 105 and the remote computing resources 110 to illustrate what parts of the architecture may perform these operations. That is, actions defined by blocks arranged beneath the voice-controlled assistant 105 may be performed by the voice-controlled assistant 105, and similarly, actions defined by blocks arranged beneath the remote computing resources 110 may be performed by the remote computing resources 110. Of course, in other implementations, the operations may be performed by other entities. In addition, while the actions described illustrate one implementation, more or fewer actions may be performed in alternative implementations. For example, in another implementation performing ASR and determining a response may not be implemented and other activities may be performed by the remote computing resources 110.

At 702, the voice-controlled assistant 105 obtains at least first and second audio signals representing audio captured by at least two audio transducers located within an environment, such as the example environment 102. In some instances, the voice-controlled assistant 105 captures one of the audio signals using a first audio transducer and captures a second audio signal using a second audio transducer, both of which are part of an audio transducer array. In some implementations, the voice-controlled assistant may also receive one or more additional audio signals from other audio transducers within the environment 102. These additional audio transducers may be part of the voice-controlled assistant or separate from the voice-controlled assistant. In either instance, the voice-controlled assistant 105 may designate one of the audio signals as the primary audio signal.

At 704, the voice-controlled assistant 105 determines a time offset between the two signals. In instances where the voice-controlled assistant 105 receives additional audio signals captured by additional audio transducers, the voice-controlled assistant 105 may also determine a time offset between each additional audio signal and the primary audio signal and/or the time offset between the additional audio signals and other, non-primary audio signals.

At 706, the voice-controlled assistant 105 identifies differences that are greater than a threshold between the first and second audio signals. The voice-controlled assistant 105 may do so by utilizing the time offset determined at 704. In instances where there are more than two audio signals, the voice-controlled assistant 105 may identify differences that exceed a threshold between the first audio signal (selected as the primary audio signal) and each of the other audio signals. In other instances, the voice-controlled assistant 105 may identify differences that exceed a threshold between the first audio signal (selected as the primary audio signal) and one or more of the other audio signals, such as a second audio signal and also determine the difference that exceed a threshold between two or more of the audio signals not selected as the primary signal. For example, if there are three audio signals, the voice-controlled assistant 105 may select the first signal as the primary audio signal, determine differences that exceed a threshold between the first signal and the second signal and determine differences that exceed a threshold between the first signal and the third signal. Alternatively, the voice-controlled assistant may select the first audio signal as the primary audio signal, determine differences that exceed a threshold between the first audio signal and the second audio signal and determine differences that exceed a threshold between the second audio signal and the third audio signal.

At 708, the voice-controlled assistant 105 sends the first audio signal (designated as the primary signal), the information indicative of the signal differences (or difference information) and a time offset between the audio signals. As discussed above, the voice-controlled assistant 105 may utilize lossy and/or lossless compression prior to sending this data to the remote computing resources 110. The voice-controlled assistant 105 may also remove constant noise, or other unwanted frequencies included in one or more of the different audio signals.

At 710, the remote computing resources 110 receive the first audio signal, the information indicative of the signal differences and the time offset. The remote computing resources may form a portion of a network-accessible distributed computing platform in some instances.

At 712, the remote computing resources 110 construct a representation of the second audio signal. For instance, the resources 110 may make a copy of the first audio signal and then replace or combine segments or samples of the first audio signal with segments/samples of the second audio signal representing the signal differences between the two audio signals. The remote computing resources 110 may utilize the time offset when doing so to replace the segments/samples at the proper location(s). In instances where there are more than two audio signals, the remote computing resources 110 may construct representations of each of the additional audio signals using similar means. In addition, in instances where difference information for additional audio signals have been determined based on a comparison with other non-primary audio signals, the remote computing resources 110 may construct representations of those additional audio signals based on other non-primary signals that have been reconstructed. Returning to the example of three audio signals, with the first signal selected as the primary signal, difference information exceeding a threshold determined between the second audio signal and the first audio signal and difference information exceeding a threshold determined between the third audio signal and the second audio signal, the remote computing resources 110 may first construct a representation of the second audio signal based on the first audio signal (the primary audio signal), time offset data and the difference information between the second audio signal and the first audio signal. Subsequently, the remote computing resources 110 may reconstruct a representation of the third audio signal based on the constructed representation of the second audio signal, time offset data and difference information between the third audio signal and the second audio signal.

FIG. 7B continues the illustration of the process 700 and includes, at 713, the remote computing resources 110 performing signal processing on the first and/or second signals and potentially any other signals. This may include beamforming, echo cancellation, noise reduction, dereverberation, blind source separation and the like. Once signal processing is complete, any number of additional functions may be performed by the remote computing resources 110. For example, at 714 the remote computing resources 110 may perform ASR on the processed signals and identify commands within the audio captured in the environment. In other instances, the remote computing resources may determine a direction of an audio source within one of the processed signals and the like. In some instances, the resources 110 utilize techniques that require computational capacity beyond the capacity available at the environment 102.

At 716, the remote computing resources 110 determine a response to provide based on the signal processing and/or any other functions performed on the processed signals (e.g. ASR). For instance, if the resources 110 determine that a user requested to purchase an item, the remote computing resources 110 may initiate fulfillment of the request. For instance, the resources 110 may proceed to purchase the item on behalf of the user. In the example discussed above, if the resources determine that the user is asking about the current temperature outside at the user's location, then the remote computing resources 110 may locate this information.

At 718, the remote computing resources 110 may provide data indicative of the determined response back to the environment (e.g., to the voice-controlled assistant 105). This may include data for output in the environment, for storage at the voice-controlled assistant 105 and the like.

At 720, the voice-controlled assistant 105 receives the data indicative of the response. The voice-controlled assistant 105 may store this data or may cause output of content based on this data, within the environment 102 or otherwise.

At 722, for example, the voice-controlled assistant 105 outputs content in the environment based on the data. This may include audibly outputting content (e.g., "It is currently 72 degrees Fahrenheit outside," "Your order has been placed," etc.). In instances where the voice-controlled assistant 105 includes a display, meanwhile, the voice-controlled assistant 105 may output this content on the display. In still other instances, the voice-controlled assistant 105 may communicate with other output devices, in the environment 102 or otherwise, and may instruct these other devices to output the content audibly and/or visually.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
under control of one or more computing devices configured with executable instructions,
obtaining a first audio signal from a first audio transducer and a second audio signal from a second audio transducer, wherein the first audio transducer and the second audio transducer are included in an audio transducer array located within an environment;
determining a time offset between the first audio signal and the second audio signal based at least in part on a time-difference-of-arrival between the first audio signal and the second audio signal;
identifying, based at least in part on the time offset, at least one difference between at least a portion of the first audio signal and at least a portion of the second audio signal; and
sending, to one or more computing resources that are remote from the environment, the first audio signal, information indicative of the at least one difference between the first audio signal and the second audio signal, and an indication of the time offset between the first audio signal and the second audio signal, the one or more computing resources that are remote from the environment being configured to: (i) construct a representation of the second audio signal using the first audio signal, the information indicative of the at least one difference between the first audio signal and the second audio signal, and the indication of the time offset between the first audio signal and the second audio signal, and (ii) perform automatic speech recognition (ASR) to identify a voice command present in at least one of the first audio signal or the representation of the second audio signal.

2. A method as recited in claim 1, further comprising:
obtaining a third audio signal from a third audio transducer within the environment;
determining a time offset between the third audio signal and the first audio signal; and
identifying, based at least in part on the time offset between the third audio signal and the first audio signal, at least one difference between at least a portion of the first audio signal and the third audio signal; and
wherein sending further comprises sending information indicative of the at least one difference between the first audio signal and the third audio signal, and the determined time offset between the first audio signal and the third audio signal.

3. A method as recited in claim 1, wherein:
the first audio signal includes a first set of segments and the second audio signal comprises a second set of segments;
sending of the first audio signal includes sending the first set of segments; and
sending information indicative of the at least one difference between the first audio signal and the second audio signal includes sending at least one segment of the second set of segments.

4. A method as recited in claim 3, wherein the at least one segment of the second set of segments includes an audio signal that is different than audio signals of the first set of segments.

5. A method as recited in claim 1, wherein:
the first audio signal includes a first set of segments and the second audio signal includes a second set of segments;
sending of the first audio signal includes sending the first set of segments; and
sending information indicative of the at least one difference between the first audio signal and the second audio signal includes sending information indicative of differences between corresponding segments of the first audio signal and the second audio signal.

6. A method as recited in claim 1, wherein the time-difference-of-arrival between the first audio signal and the second audio signal is determined using cross-correlation.

7. A method as recited in claim 1, wherein the one or more computing resources that are remote from the environment form a portion of a network-accessible computing platform.

8. A method as recited in claim 1, wherein the one or more computing resources that are remote from the environment form a portion of a distributed computing platform.

9. A method as recited in claim 1, further comprising compressing at least one of the first audio signal and the information indicative of the at least one difference between the first audio signal and the second audio signal prior to the sending.

10. A method as recited in claim 1, further comprising removing from the first audio signal and at least a portion of the second audio signal an audio frequency that is included in the first audio signal and the second audio signal prior to the sending.

11. A method as recited in claim 10, wherein the audio frequency is not perceptible to a human ear.

12. A method as recited in claim 10, wherein the audio frequency is constant.

13. One or more non-transitory computer-readable media storing computer-executable instructions that, when executed on one or more processors, cause the one or more processors to perform acts comprising:
receiving during a time interval a first signal based on audio within an environment;
receiving during the time interval a second signal based on the audio within the environment;
identifying difference information between the first signal and the second signal; and
sending the first signal and the difference information to one or more computing resources that are remote from the environment, the one or more computing resources that are remote from the environment configured to: (i) construct a representation of the second signal using the first signal and the difference information, and (ii) perform automatic speech recognition (ASR) using at least one of the first signal or the representation of the second signal to identify a voice command uttered within the environment.

14. One or more non-transitory computer-readable media as recited in claim 13, wherein the first signal represents audio captured by a first audio transducer at a first location in the environment and the second signal represents the audio captured by a second audio transducer at a second location in the environment.

15. One or more non-transitory computer-readable media as recited in claim 13, wherein the difference information includes at least a portion of the second signal.

16. One or more non-transitory computer-readable media as recited in claim 13, wherein the difference information identifies that there are no differences between the first signal and the second signal that exceed a threshold.

17. One or more non-transitory computer-readable media as recited in claim 13, wherein the difference information includes information indicative of a difference between the first signal and the second signal that exceeds a threshold.

18. One or more non-transitory computer-readable media as recited in claim 13, the acts further comprising determining a time offset between the first signal and the second signal.

19. One or more non-transitory computer-readable media as recited in claim 18, wherein the identifying comprises:
aligning segments of the first signal to corresponding segments of the second signal based at least in part on the determined time offset; and
comparing the aligned segments to identify the difference information of the first signal and the second signal.

20. One or more non-transitory computer-readable media as recited in claim 18, wherein sending further includes sending the determined time offset to the one or more computing resources that are remote from the environment.

21. One or more non-transitory computer-readable media as recited in claim 13, the acts further comprising:
receiving during the first time interval a third signal based on the audio in the environment; and
identifying difference information between the third signal and the first signal.

22. One or more non-transitory computer-readable media as recited in claim 21, wherein sending further includes sending the identified difference information between the third signal and the first signal.

23. One or more non-transitory computer-readable media as recited in claim 21, the acts further comprising:
determining a time offset between the first signal and the third signal; and
wherein the sending further includes sending:
the identified difference information between the third signal and the first signal; and
the determined time offset between the first signal and the third signal.

24. One or more non-transitory computer-readable media as recited in claim 13, the acts further comprising:
receiving during the first time interval a third signal based on the audio in the environment; and
identifying difference information between the third signal and the second signal.

25. One or more computing resources comprising:
one or more processors; and
one or more computer-readable media storing computer-executable instructions that, when executed on the one or more processors, cause the one or more processors to perform acts comprising:
receiving a first signal based at least in part on audio captured by a first audio transducer of an audio transducer array located within an environment;
receiving information indicative of a difference between the first signal and a second signal based at least in part on the audio as captured by a second audio transducer of the audio transducer array;
constructing a representation of the second signal based at least in part on the received first signal and the received information indicative of the difference between the first signal and the second signal; and
performing, using at least one of the first signal or the constructed representation of the second signal, automatic speech recognition (ASR) to identify a voice command uttered within the environment.

26. One or more computing resources as recited in claim 25, wherein receiving information indicative of a difference includes receiving individual segments of the second signal.

27. One or more computing devices as recited in claim 25, the acts further comprising receiving an indication of a time offset between the first signal and the second signal, and wherein constructing a representation of the second signal is based at least in part on the indication of the time offset between the first signal and the second signal.

28. One or more computing devices as recited in claim 25, the acts further comprising:
receiving information indicative of a difference between the first signal and a third signal, the third signal representing the audio captured by a third audio transducer at a third location within the environment;
receiving an indication of a time offset between first signal and the third signal;
constructing a representation of the third audio signal based at least in part on:
the information indicative of the difference between the first signal and the third signal; and
the time offset between the first signal and the third signal.

29. One or more computing devices as recited in claim 25, the acts further comprising:
determining, based at least in part on the received first signal and the constructed representation of the second signal, a response to provide to one or more computing devices at the environment; and providing data indicating the response to the one or more computing devices at the environment.

30. One or more computing devices as recited in claim 25, the acts further comprising:

receiving information indicative of a difference between the second signal and a third signal, the third signal representing the audio captured by a third audio transducer at a third location within the environment;

receiving an indication of a time offset between second signal and the third signal;

constructing a representation of the third audio signal based at least in part on:
    the constructed representation of the second signal;
    the information indicative of the difference between the second signal and the third signal; and
    the time offset between the second signal and the third signal.

\* \* \* \* \*